US012459291B1

(12) United States Patent
Hinds

(10) Patent No.: US 12,459,291 B1
(45) Date of Patent: Nov. 4, 2025

(54) PAINT BRUSH DRAINING SYSTEM

(71) Applicant: Michael S. Hinds, Natchitoches, LA (US)

(72) Inventor: Michael S. Hinds, Natchitoches, LA (US)

( * ) Notice: Subject to any disclaimer, the term of this patent is extended or adjusted under 35 U.S.C. 154(b) by 0 days.

(21) Appl. No.: 18/532,239

(22) Filed: Dec. 7, 2023

(51) Int. Cl.
*B44D 3/12* (2006.01)
*A47L 13/52* (2006.01)
*B05C 17/10* (2006.01)

(52) U.S. Cl.
CPC .............. *B44D 3/128* (2013.01); *A47L 13/52* (2013.01); *B05C 17/10* (2013.01)

(58) Field of Classification Search
CPC ...................................................... B44D 3/128
USPC ........................................................ 220/701
See application file for complete search history.

(56) References Cited

U.S. PATENT DOCUMENTS 2,435,036 A * 1/1948 Ferguson .............. B44D 3/128 220/701
2,960,257 A * 11/1960 Sasse .................... B44D 3/128 220/733
4,150,763 A * 4/1979 Simpson ................ B44D 3/162 220/571
4,832,293 A 5/1989 Gizzi
5,123,576 A 6/1992 Lawrence
5,172,822 A 12/1992 DeFrance
6,213,338 B1 4/2001 Cogdil
9,145,025 B2 9/2015 Nazlian
10,005,591 B2 * 6/2018 Al-Housseiny ........ B44D 3/128
D832,545 S 10/2018 Rus
D832,546 S 10/2018 Rus
2003/0121925 A1 7/2003 Mowe
2010/0116834 A1 5/2010 Sulick, Jr.
2021/0315372 A1 10/2021 Patterson

* cited by examiner

*Primary Examiner* — Stephen J Castellano
(74) *Attorney, Agent, or Firm* — Cramer Patent & Design; Aaron R. Cramer

(57) ABSTRACT

The paint brush draining system may comprise a tray and a can coupler. The paint brush draining system may detachably couple to the top of a paint can such that a top aperture of the paint can may be partially covered by the tray. The paint brush draining system may be configured for bristles of a paint brush to be dipped into the paint to load paint and then wiped against an exposed edge of the tray to remove excess paint that may drip back into the paint can. The can coupler may retain the tray on a rim of the paint can. Independent of the paint can, the paint brush draining system may be operable as a dustpan or as a spreader.

1 Claim, 2 Drawing Sheets

PAINT BRUSH DRAINING SYSTEM

RELATED APPLICATIONS

None.

FIELD OF THE DEVICE

The present device relates generally to painting tools and accessories. More particularly, the device pertains to a system for draining excess paint from paint brushes, designed to attach to a paint can which facilitates a cleaner, more efficient painting process.

BACKGROUND OF THE DEVICE

The task of painting with a brush commonly involves dipping the brush into a can of paint and then brushing the excess paint off on the rim of the can. This conventional method often results in paint dripping down the side of the can, creating a mess and wasting paint. Additionally, resting a wet paintbrush across the open can when not in active use can lead to paint drying on the brush, uneven loading of paint, or contamination of the paint in the can with debris.

Several devices have been proposed to address the inefficiencies and mess associated with painting. These include various forms of brush wipers, holders, and stands that attach to paint cans. However, these devices have limitations. For example, some require complex attachment methods, do not securely attach to the paint can, or are not suitable for various can sizes. Others are not multifunctional, being limited to use only with paint cans and not as standalone tools for other applications.

Furthermore, most existing solutions are not designed to account for the natural motion of a painter's hand when removing excess paint from a brush. They often neglect the ergonomic aspect, which can lead to inefficient paint removal and increased physical strain on the user. Some existing devices also do not consider the environmental impact, being made from materials that are not biodegradable or recyclable.

There is, therefore, a need for an improved paint brush draining system that overcomes the above-mentioned deficiencies. Such a system would be easy to attach and remove from a paint can, accommodate different can sizes, allow for efficient paint removal from the brush, and minimize spillage and waste. Moreover, it would ideally provide multi-functional utility and be manufactured from environmentally friendly materials. The development of the paint brush draining system fulfills this need in a method that is easy and cost effective.

SUMMARY OF THE DEVICE

Embodiments of the present disclosure may include a paint brush draining system including a tray configured to detachably couple to a top of a paint can. In some embodiments, the tray. Embodiments may also include partially covers a top aperture of the paint can when coupled. Embodiments may also include an exposed edge on the tray against which bristles of a paint brush can be. Embodiments may also include wiped to remove excess paint. Embodiments may also include a can coupler attached to the tray. In some embodiments, the can coupler retains the tray on a. Embodiments may also include rim of the paint can.

In some embodiments, the tray may include a semi. Embodiments may also include rigid disk defined by an arc and a chord. In some embodiments, the diameter of the disk may be approximately equal to the diameter of the paint can, allowing the arc to align with the circumference of the paint can when the tray may be positioned thereon.

In some embodiments, the chord defines the exposed. Embodiments may also include edge of the tray. In some embodiments, the center of the chord may be suspended above paint contained within the paint can. In some embodiments, the tray creates a covered. Embodiments may also include portion and an uncovered portion of the top aperture of the paint can, allowing access to the paint within the paint can through the uncovered portion.

In some embodiments, the tray covers less than or. Embodiments may also include equal to fifty percent (50%) of the top aperture of the paint can. In some embodiments, the paint brush draining system may include a left wing and a right wing, each being three-sided segments located at. Embodiments may also include opposing outside corners of the tray. Embodiments may also include a center portion from which the left wing and the right wing extend.

Embodiments may also include each of the left wing and the. Embodiments may also include right wing includes a wing seam running from the arc to the chord, allowing the wings to be bent upwards to an oblique angle relative to the center portion. In some embodiments, the wing seam defines a. Embodiments may also include straight line between a first juncture on the arc and a second juncture on the chord for the left wing, and between a third juncture on the arc and a fourth juncture on the chord for the right wing.

In some embodiments, the can coupler may include a horizontal flange that presses flat against a bottom surface of the tray. Embodiments may also include a vertical rib that extends downward from the horizontal flange and may be. Embodiments may also include configured to deform and press into a groove on the rim of the paint can to retain the tray on the paint can.

In some embodiments, the vertical rib may be deformable. Embodiments may also include to exit the groove when an external upward force may be applied to the tray, facilitating detachment of the system from the paint can. In some embodiments, the tray and the vertical rib. Embodiments may also include may be made from one or more materials selected from the group consisting of biodegradable plastic, metal, and wax-coated cardboard.

In some embodiments, the paint brush draining. Embodiments may also include system may be operable independently of the paint can as one of a dustpan or a spreader by using the exposed edge of the tray against a work surface. In some embodiments, the left wing and the right wing of the tray can be bent upwards to stiffen the implement when used as a spreader.

Embodiments of the present disclosure may also include a method for using a paint brush draining system, including detachably coupling the tray of the paint brush draining system to a top of a. Embodiments may also include paint can. Embodiments may also include loading bristles of a paint brush with paint by dipping into an uncovered. Embodiments may also include portion of a top aperture of the paint can. Embodiments may also include wiping the bristles against the exposed edge of the tray to remove excess. Embodiments may also include paint. Embodiments may also include removing the tray from the paint can after use. In some embodiments, the paint brush may be rotated around its handle by. Embodiments may also include one hundred and eighty degrees (180°) and an opposite side of the paint brush may be wiped on the exposed edge of the tray.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

DESCRIPTIVE KEY

Figure 1:
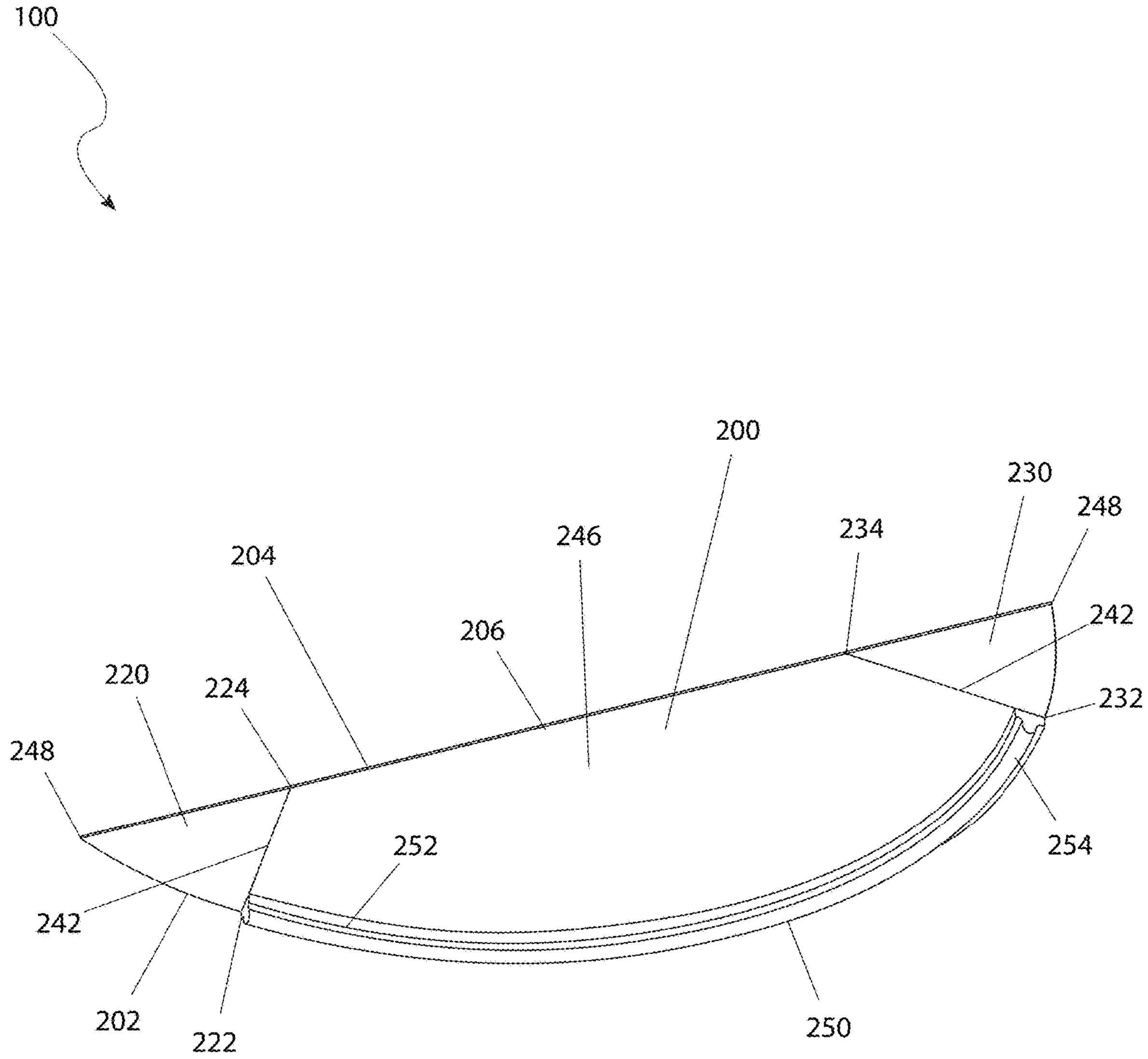
FIG. 1 is a bottom isometric view of a paint brush draining system 100, according to an embodiment of the present device.
Figure 2:
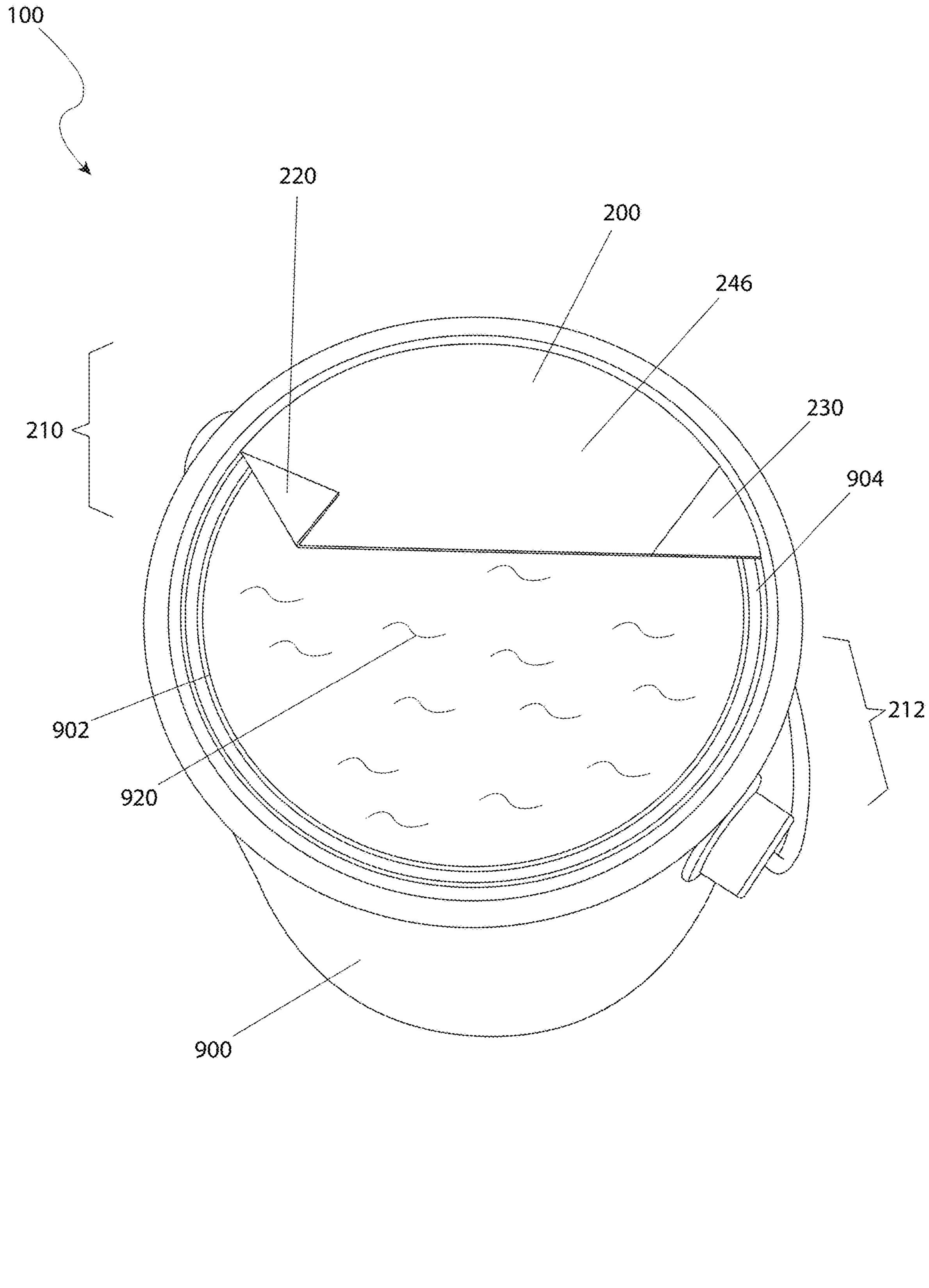
FIG. 2 is an in-use view of a paint brush draining system 100, according to an embodiment of the present device.

100 paint brush draining system
200 tray
202 arc
204 chord
206 exposed edge
210 covered portion
212 uncovered portion
220 left wing
222 first juncture
224 second juncture
230 right wing
232 third juncture
234 fourth juncture
242 wing seam
246 center portion
248 outside corner
250 can coupler
252 horizontal flange
254 vertical rib
900 paint can
902 top aperture
904 rim
920 paint

Description of the Device

The present device is directed to a paint brush draining system (herein described as the "device") 100. The device 100 may comprise a tray 200 and a can coupler 250. The device 100 may detachably couple to the top of a paint can 900 such that a top aperture 902 of the paint can 900 may be partially covered by the tray 200. The device 100 may be configured for bristles of a paint brush to be dipped into the paint can 900 to load paint 920 and then wiped against an exposed edge 206 of the tray 200 to remove excess paint that may drip back into the paint can 900. The can coupler 250 may retain the tray 200 on a rim 904 of the paint can 900. Independent of the paint can 900, the device 100 may be operable as a dustpan or as a spreader.

The tray 200 may be placed on top of the paint can 900 to partially cover the top aperture 902 of the paint can 900. The tray 200 may be a circular segment of a semi-rigid disk. The tray 200 may be defined by an arc 202 and a chord 204. The diameter of the semi-rigid disk may be the same as the diameter of the paint can 900 such that the arc 202 may align with the circumference of the paint can 900 when the tray 200 is in position on top of the paint can 900. The chord 204 may cut straight across the top of the paint can 900 to define the exposed edge 206 of the tray 200. The center of the chord 204 may be suspended above the paint 920 that is held within the paint can 900.

The tray 200 may create a covered portion 210 of the top aperture 902 and an uncovered portion 212 of the top aperture 902. The tray 200 may be the covered portion 210 of the top aperture 902. The bristles of the paint brush may be dipped into the paint 920 within the paint can 900 through the uncovered portion 212 of the top aperture 902. The bristles of the paint brush may be wiped against the exposed edge 206 of the tray 200 as the paint brush is withdrawn from the paint can 900.

The tray 200 may cover less than one hundred percent (100%) of the top aperture 902 of the paint can 900. In a preferred embodiment, the tray 200 may cover less than or equal to fifty percent (50%) of the top aperture 902 of the paint can 900.

The tray 200 may comprise a left wing 220 and a right wing 230. The left wing 220 and the right wing 230 may be three-sided segments of the tray 200 located at opposing outside corners 248 of the tray 200. The left wing 220 and the right wing 230 may be separated by a center portion 246 of the tray 200. The left wing 220 and the right wing 230 may be folded upwards to stiffen the tray 200. The left wing 220 and the right wing 230 may also be used to pull the tray 200 off of the paint can 900.

An individual wing selected from the left wing 220 and the right wing 230 may comprise a wing seam 242 running from the arc 202 to the chord 204. The wing seam 242 may be a boundary between the individual wing and the center portion 246 of the tray 200. The wing seam 242 for the left wing 220 may be a straight line between a first juncture 222 on the arc 202 and a second juncture 224 on the chord 204. The wing seam 242 for the right wing 230 may be a straight line between a third juncture 232 on the arc 202 and a fourth juncture 234 on the chord 204.

The individual wing may bend at the wing seam 242 such that the individual wing may be bent upwards to an oblique angle relative to the center portion 246 of the tray 200 by lifting the outside corner 248 of the individual wing.

The tray 200 may be symmetrical. The left wing 220 and the right wing 230 may have the same size and shape except for being mirror images of each other. In some embodiments, the distance between the first juncture 222 and the second juncture 224 may be the same as the distance between the third juncture 232 and the third juncture 232 and the distance between the outside corner 248 of the left wing 220 and the second juncture 224 may be the same as the distance between the outside corner 248 of the right wing 230 and the fourth juncture 234.

The can coupler 250 may be coupled to the bottom side of the tray 200 adjacent to the arc 202. The can coupler 250 may be curved to follow the trajectory of the arc 202. The can coupler 250 may extend between the left wing 220 and the right wing 230. The can coupler 250 may be excluded from extending onto the left wing 220 and the right wing 230 so that the left wing 220 and the right wing 230 may bend upwards without interference.

The can coupler 250 may comprise a horizontal flange 252 and a vertical rib 254. The horizontal flange 252 may press flat against the bottom surface of the tray 200. The vertical rib 254 may extend downward from the horizontal flange 252. The vertical rib 254 may deform to press into a groove on the rim 904 of the paint can 900 and may then retain the tray 200 on the paint can 900. The vertical rib 254 may deform to exit the groove when external upward force is applied to the tray 200.

As non-limiting examples, the tray 200 and the vertical rib 254 may be made from biodegradable plastic, metal, wax-coated cardboard, or any combination thereof.

In use, the Device 100 may be detachably coupled to the top of a paint can 900 by positioning the tray 200 on top of the paint can 900, by aligning the can coupler 250 with the rim 904 of the paint can 900, and by pressing downward such that the vertical rib 254 of the can coupler 250 is forced into the groove on the rim 904 of the paint can 900. Once in place, the tray 200 may cover a portion of the top aperture 902 of the paint can 900. A paint brush may be lowered into the uncovered portion 212 of the top aperture 902 such that the bristles are loaded with paint 920. The bristles may be wiped against the exposed edge 206 of the tray 200 to remove excess paint as the paint brush is lifted. If necessary, the paint brush may be rotated around the handle by one hundred degrees) (180° and the opposite side of the paint brush may be wiped on the exposed edge 206 of the tray 200. When finished painting, the tray 200 may be removed from the paint can 900 and cleaned for reuse.

The device 100 may be used as a dustpan by placing the center portion 246 of the bottom of the exposed edge 206 against a work surface with the center of the arc 202 raised such that the tray 200 forms an oblique angle with the work surface and by sweeping dust onto the tray 200 using a brush that has not been used for painting. This may be done with or without the left wing 220 and the right wing 230 bent upwards.

The device 100 may be used as a spreader by placing a spreadable substance on the work surface, by placing the device 100 adjacent to the spreadable substance with the center portion 246 of the bottom of the exposed edge 206 against the work surface and the center of the arc 202 raised such that the tray 200 forms an oblique angle with the work surface, and by dragging the tray 200 over the spreadable substance while pressing the tray 200 against the work surface. The left wing 220 and the right wing 230 may be bent to stiffen the spreader. As non-limiting examples, the spreadable substance may be glue, wood filler, or spackle.

The exact specifications, materials used, and method of use of the device 100 may vary upon manufacturing. The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A paint brush draining system consisting of:

a tray configured to detachably couple to a top of a paint can, wherein the tray partially covers a top aperture of the paint can when coupled; the tray consisting of:

an exposed edge defined by a chord extending across the tray, the exposed edge configured for wiping bristles of a paint brush to remove excess paint;

a can coupler attached to a bottom surface of the tray, the can coupler consisting of a horizontal flange and a deformable vertical rib configured to press into and be retained within a groove on a rim of the paint can; and, a left wing and a right wing positioned at opposing outside corners of the tray, each wing comprising a wing seam extending between a first juncture on an arc of the tray and a second juncture on the chord, the left wing and the right wing being foldable upward along the respective wing seams to stiffen the tray when bent upward; and, wherein the tray comprises a semi-rigid disk defined by the arc and the chord, wherein a diameter of the semi-rigid disk is approximately equal to a diameter of the paint can, such that the arc aligns with a circumference of the paint can when the tray is positioned thereon; and, wherein the tray covers less than or equal to fifty percent of the top aperture of the paint can, leaving an uncovered portion for accessing paint within the paint can.

* * * * *